United States Patent [19]

Foster et al.

[11] Patent Number: 4,631,363
[45] Date of Patent: Dec. 23, 1986

[54] METHOD AND APPARATUS FOR INCREMENTAL LOAD SIMULATION

[75] Inventors: Robert W. Foster, Glen Ellyn; Max D. Weekly, Big Rock, both of Ill.

[73] Assignee: AT&T Bell Laboratories, Murray Hill, N.J.

[21] Appl. No.: 798,137

[22] Filed: Nov. 14, 1985

Related U.S. Application Data

[63] Continuation of Ser. No. 269,265, Jun. 1, 1981, abandoned.

[51] Int. Cl.⁴ .............................................. H04Q 11/00
[52] U.S. Cl. ........................................ 379/15; 379/34; 379/284
[58] Field of Search .............................. 364/200, 900; 179/18 ES, 18 HB, 2 DP

[56] References Cited

U.S. PATENT DOCUMENTS

| | | | |
|---|---|---|---|
| 3,793,490 | 2/1974 | Karras | 179/175.2 R |
| 4,255,624 | 3/1981 | Walton et al. | 179/175.2 D |
| 4,255,625 | 3/1981 | Walton et al. | 179/175.2 D |
| 4,354,225 | 10/1982 | Frieder et al. | 364/200 |
| 4,475,047 | 10/1984 | Ebert | 307/66 |

*Primary Examiner*—Gareth D. Shaw
*Assistant Examiner*—John G. Mills
*Attorney, Agent, or Firm*—Werner Ulrich; Peter Visserman

[57] ABSTRACT

An adjustable incremental load simulator 200 acts upon a telephone control processor 300 to drive the processor toward and into an overload state. This is accomplished by reducing the number of processing cycles available for system task execution by execution control 360. The simulator 200 pulses an interrupt circuit 350, thereby halting the execution of system tasks for a fixed number of processing cycles. The adjustable incremental load simulator has an adjustment which controls the rate of generation of interrupt signals and thereby controls the rate at which system task execution cycles are made unavailable to the execution control. The performance of the system is monitored via a display 150; thus, the simulated incremental load can be adjusted while system performance is monitored.

19 Claims, 9 Drawing Figures

| DISP-TIME |
| DISP-OCC |
| DTST-LEN |
| DTST-TIME |
| DTST-REQ |
| DTST-SUC |
| FILL-ACC |
| |
| |

LINE SCAN PROGRAM

PERIPHERAL ORDER BUFFER
DTST SUCCESS PROGRAM

METHOD AND APPARATUS FOR INCREMENTAL LOAD SIMULATION

CROSS-REFERENCE TO RELATED APPLICATION

This application is a continuation of application Ser. No. 269,265, filed June 1, 1981, now abandoned.

TECHNICAL FIELD

This invention relates to methods and apparatus for obtaining accurate estimates of the capacity of stored program controlled systems, more specifically, telecommunications control, process control, and computational processing systems capable of responding to interrupt signals.

BACKGROUND OF THE INVENTION

Stored program controlled systems generally are limited in performance capacity by their data processing resources, and more specifically, by the processing capacity of its central processing unit. If various system tasks each take a certain number of central processor cycles, and the total number of such cycles available in any unit of time is limited, then the number of system tasks which can be performed in any given time period is also limited. For example, in terms of a stored program controlled telephone switching system, this limitation means that the number of telephone call connections which can be set up and released by the system during any given interval is limited.

In a real-time system, task execution demands and the central processor resources required to respond to these demands tend to vary significantly with time and in a partly random fashion. Thus, predictions of system capacity based on simulation of inputs to the system tend to be imperfect because they lack a realistic random element. It is particularly important to have accurate estimates of residual capacity of working system installations since additions of equipment to these systems and long term growth plans must be made on the basis of these estimates. For example, capacity information for an existing telephone central office is important to telephone engineers in the planning of growth additions to that central office.

In the past, estimates of capacity have typically been made through a study of the available central processor resources during periods of light and heavy processing loads, and an extrapolation of these available resources as a function of the number of system tasks carried out during these periods. Artifical load, applied through the use of load boxes for generating large numbers of inputs to augment a real load in the system, also has been used to help estimate capacity. These estimates are not always sufficiently accurate. For example, in a telephone switching system, these estimates tend to be limited in their accuracy by the special characteristics of a particular installation, including variations in the percentages of different types of traffic (incoming, outgoing, interoffice, etc.) and variations in the special habits of the customers connected to a particular installation (retrial rate, busy rate, etc.).

It is an object of this invention to provide a method and apparatus for making realistic estimates of capacity of an existing system by simulating incremental load increases while the system is carrying live load. It is a further object of this invention to drive a system into an overload state by depriving the system of central processor resources in a uniform manner, affecting all system tasks equally. It is a still further object of this invention to allow system performance to be measured in a live system that is thus driven into an overload state.

Still another object of this invention is to allow the realistic loading of a system that is carrying moderate mounts of live load to an overload state and providing indications of the performance of the system in such an overload state, and more particularly, to allow evaluation of system overload response strategies in an overload state.

SUMMARY OF THE INVENTION

The aforementioned objects are achieved in accordance with this invention by controlling the time available for the execution of system tasks through depriving the system of processing cycles in a uniform manner by the application of a controllable rate interrupt signal, such interrupts being imposed on the system while it is carrying out its normal tasks and its performance is being measured. The processing of such interrupts takes away processing time potentially available for the execution of normal system tasks.

Performance is measured by measuring response time to system inputs, such as requests for service, which also may be generated by the system, and by measuring time available after all system tasks have been performed. Performance can be either directly displayed via a dynamic digital or analog display, or recorded for subsequent offline processing.

Advantageously, in accordance with this invention system capacity of a digital processing system such as a telephone switching system may be accurately measured by simulating incremental additional workload on the system. The additional load is simulated by depriving the system of portions of its available task execution time on a distributed basis thereby requiring an apparently greater amount of time for the execution of the tasks. By incrementally increasing the number of portions of time taken away from the system per unit time, the system may be brought into an overload state under controlled conditions, thereby avoiding catastropic actions which otherwise may occur. The system is deprived of task execution time by "cycle stealing". A circuit is provided for generating interrupt signals at a controllable rate and the system processor is required to respond to each of the interrupt signals during task execution by executing an interrupt function. Each such execution requires a specified number of machine cycles. By controlling the rate at which the interrupt signals are generated, a selected percentage of system task execution time may be used for the execution of interrupt functions thereby creating the equivalent of a heavier workload or overload condition while the system is handling a light or normal workload. Thus, in accordance with this invention, a digital processing system may be controllably driven into an overload state by generating interrupt signals at a controllable rate, halting the execution of system tasks for a specified period of time in response to each of the interrupt signals and measuring system performance under these conditions.

The above and other objects and features of this invention are illustrated in the following description in which reference is made to the accompanying drawings.

DETAILED DESCRIPTION

Figure 1:
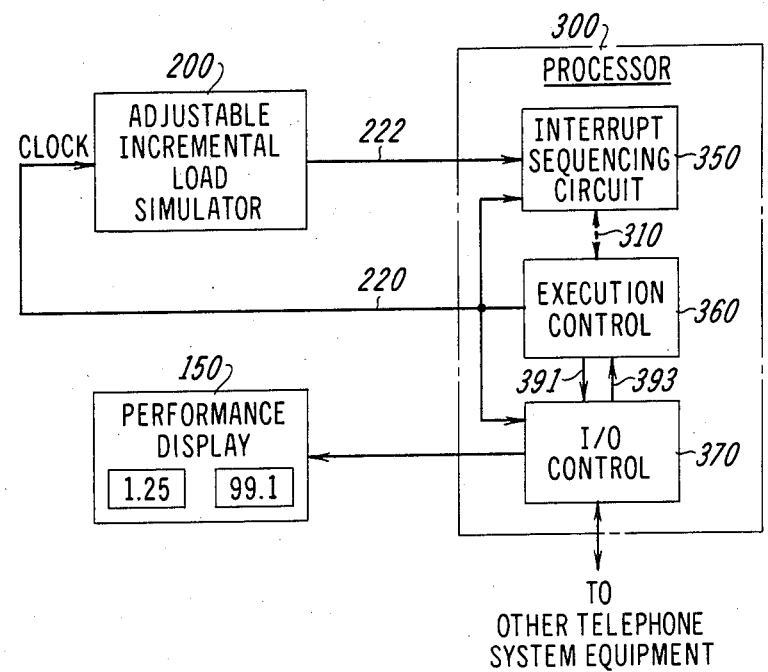
FIG. 1 is a block diagram showing an adjustable incremental load simulator and performance display in conjunction with a processor.

An illustrative embodiment of the invention is disclosed in the context of a program controlled telephone switching system. Such a system is described in detail in *The Bell System Technical Journal,* Volume 43, No.5, September, 1964. FIG. 1 shows a processor 300 to which are connected an adjustable incremental load simulator 200 and a performance display 150.

In a telephone switching system, the processor 300 will control the execution of system tasks and the operation of peripheral equipment such as switching networks and the like. The processor 300 is assumed to be connected to other telephone system equipment, but the other system equipment is not shown in the drawing, since such equipment is well known and the operation of such equipment is well understood. The processor 300 may be any of a number of known processors. It may, for example, be the Western Electric 1A Processor described in detail in *The Bell System Technical Journal,* Volume 56, No. 2, February, 1977. The processor comprises an execution control circuit 360 to execute system tasks defined by a stored program, an interrupt circuit 350 which is responsive to interrupt signals to interrupt the execution of normal system tasks, and I/O control circuitry 370 which acts as an interface between the execution control and the system's peripheral equipment, including the performance display 150. The I/O control may be any well-known circuit which can perform the appropriate interface function required to transmit the specified signal to display unit 150.

The adjustable incremental load simulator 200 can be adjusted manually to transmit interrupt signals to the processor 300 at various rates. These interrupt signals will cause the processor to stop executing system tasks for a specified number of processor execution cycles. By increasing the rate of interrupt signals, the processor can be deprived of a larger and larger fraction of the cycles available per unit time, decreasing the cycles available for carrying out system tasks.

The display unit 150 connected to the processor displays the current performance of the system. In this specific embodiment, this display consists of standard devices for displaying two 3-digit decimal numbers. The first number represents the delay encountered by the system in responding to a service request; the second represents the fraction of the time used by the system per unit time for carrying out system tasks. This fraction, also called the occupancy of the system is basically one minus the fraction of cycles available to the system for doing nonessential work.

Figure 2:
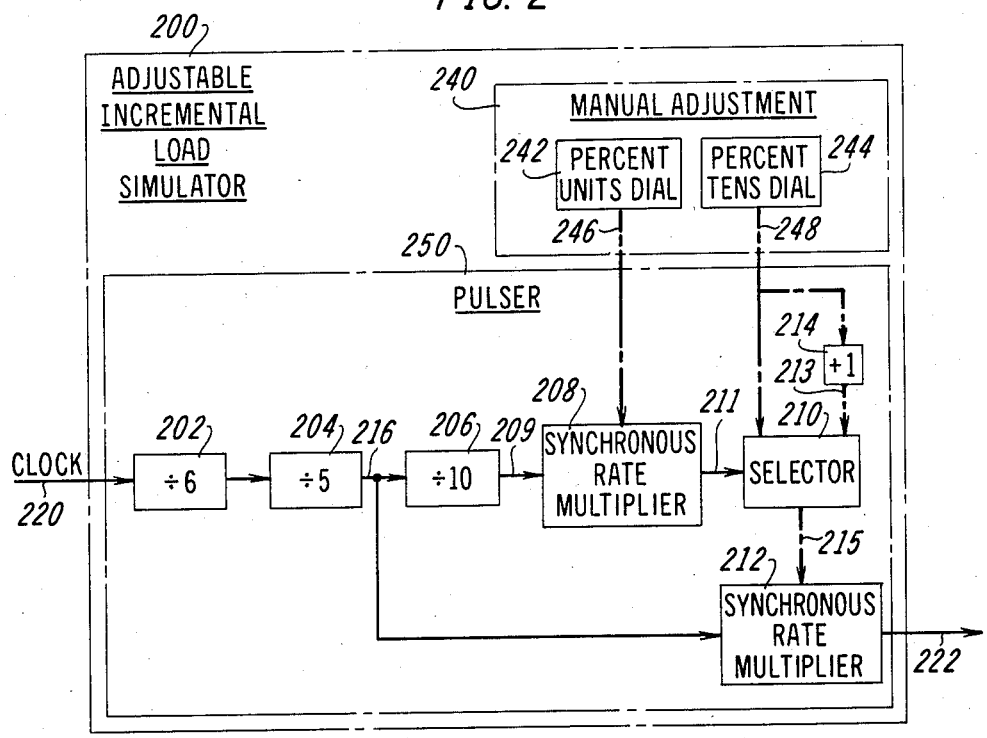
FIG. 2 is a more detailed diagram of the adjustable incremental load simulator of FIG. 1.

FIG. 2 is a more detailed diagram of the adjustable incremental load simulator 200. The manual adjustment unit 240 consists of two decimal digit control dials 242 and 244 representing units and tens digits, respectively, which represents a percentage of processor execution cycles per unit time to be consumed by interrupts. The control dials 242 and 244 may be any well-known settable numerical switches such as the socalled thumb selector switches which are commercially available. The outputs of these two dials are transmitted via cables 246 and 248, respectively, to pulser circuit 250.

Another input to the pulser 250 is a clock signal on conductor 220 which is generated by processor 300 during each processor machine cycle. This clock signal is divided in two stages by divider circuit 202 which divides the signal by 6 and divider circuit 204 which divides the signal by 5, to a low frequency signal which has a pulse frequency 1/30th that of the clock signal. The low frequency clock signal generated by divider 204 is transmitted via conductor 216 to divider circuit 206 and synchronous rate multiplier 212. The function of the circuits represented by boxes 206, 208, 210, 212 and 214 is to generate an interrupt signal on conductor 222 at a rate corresponding to the percentage figure defined by dials 242 and 244. The low frequency clock signal is divided by 10 by divider circuit 206 and the resultant signal is applied to a synchronous rate multiplier 208 via conductor 209. The multiplier circuit 208 generates an output signal having a frequency that corresponds to that of the input on conductor 209 multiplied by one-tenth the value of an input signal on cable 246 which represents the contents of the percents units dial 242. If, for example, the percents units dial were set to 5 (binary 0101), then the output rate of synchronous rate multiplier 208 would be 5 divided by 10 or one-half its input rate.

The output of the synchronous rate multipler 208 is applied to a selector circuit 210 via conductor 211. Further, the selector 210 has received an input signal from the percent tens dial 244 on cable 248 and another signal from an add-1 circuit 214 on cable 213 which represents the values of the percent tens dial increased by 1. When the output of the synchronous rate multiplier 208 on conductor 211 has a first value, for example, zero voltage, the output of the selector 210 on cable 215 corresponds to the value of the signal on cable 213. When the output of synchronous rate multiplier 208 has a second value, for example, a positive voltage, the output of the selector 210 on cable 215 corresponds to the value of the signal on cable 248.

The value represented by the signals on cable 215 corresponds to the percentage value set up in dials 242 and 244. The selector 210 produces an output value equivalent to the value of the tens dial 244 or to the value 1 greater than that set up on dial 244. The output of synchronous rate multiplier 208 on conductor 211 determines what fraction of time the selector chooses the value of dial 244 or that value increased by 1. Multiplier 208 is controlled by the value of dial 242 and the setting of this dial determines the fraction of time that the output signal of the multiplier 208 will cause the selector 210 to choose the true value of the dial 244 or that value incremented by 1. The output of selector 210 is applied to synchronous rate multiplier 212 which is used to multiply the signal appearing on conductor 216 by the value defined by the output signal of the selector 210 appearing on cable 215. In this manner, the synchronous rate multiplier 212 multiples the low frequency clock signal on conductor 216, which has a frequency of 1/30 of the basic processor clock signal on conductor 220, by the percentage value occurring on cable 215 to generate an interrupt signal on conductor 222 which is connected to the interrupt circuit 350.

As will be described later herein, the interrupt circuit 350 may be adapted to halt the execution of system tasks by the execution control 360 for 30 processor cycles in response to each interrupt signal. Thus, if the value on cable 215 is equivalent to 50 percent, causing an interrupt signal to be generated once for every 60 processor cycles, the execution control 360 would be halted once every 60 cycles for the duration of 30 cycles, or 50 percent of its time would be taken up by the action of the interrupt circuit 350. It is, therefore, apparent that the dials 242 and 244 may be set to a figure between zero and 90 percent to generate an interrupt signal on conductor 222 which would cause the execution control 360 to be halted by only a percentage of the total available time. The specific embodiment of the adjustable incremental load simulator is limited to a percentage range from zero to 90, since the synchronous rate multiplier referenced herein will only accept a maximum value of 9 at its input. The maximum value of 90 percent is higher than needed for most applications.

The various dividers 202, 204 and 206, the synchronous rate multipliers 208 and 212, the selector 210, and the add 1 circuit 214 are all well-known circuits and are readily implemented using commercially available devices. For example, using Texas Instruments T1 74 series TTL devices, the divider circuit 202 circuit can be implemented using a T1 7492 device; divider circuits 204 and 206 by using T1 7490 devices; add 1 circuit 214 by using a T1 7483 device; selector 210 by using a T1 74S157 device; and synchronous rate multipliers 208 and 212 by using T1 74167 devices.

Figure 3:
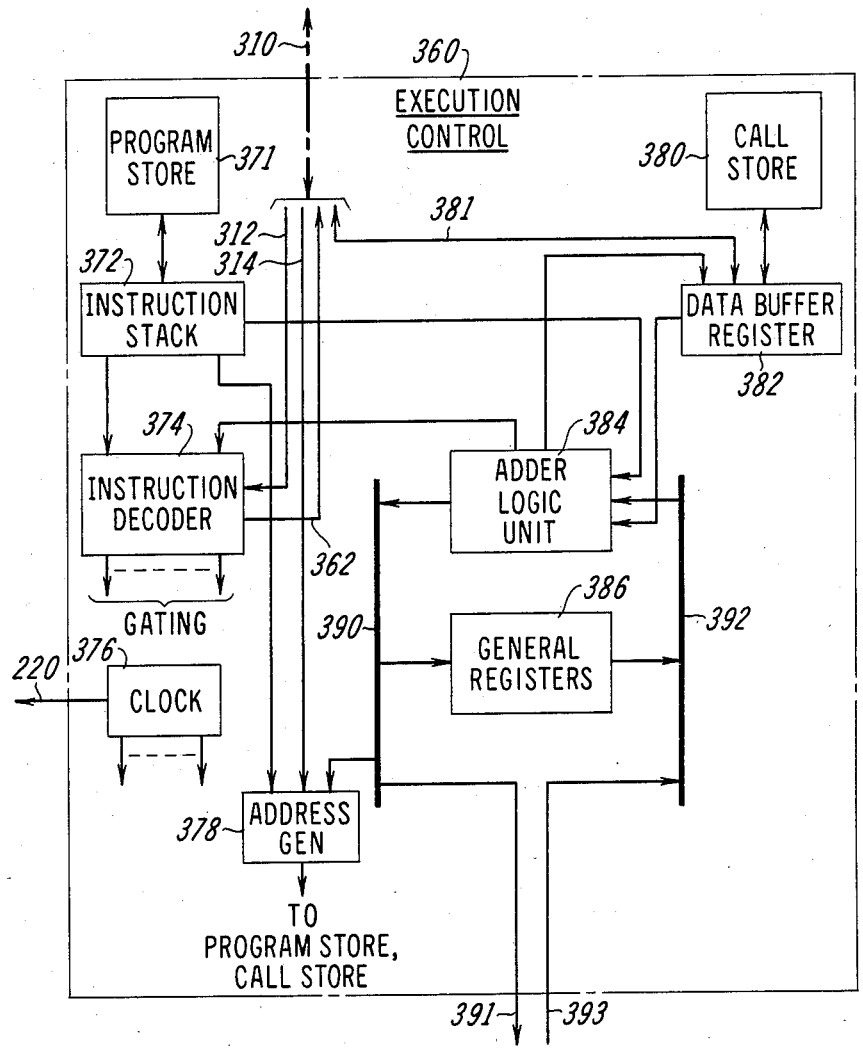
FIG. 3 is a diagram of the execution control of the processor of FIG. 1.

FIG. 3 is a more detailed block diagram of the execution control 360. The execution control is essentially a digital processor having memory for storing programs and data and the necessary circuitry to execute programs and operate on the data to control the telephone switching system. The details of such a processor are not described herein. The structure and operation of such a processor is well known in the art and is described, for example, in the aforementioned February, 1977, issue of *The Bell System Technical Journal*. The execution control 360 comprises a program store 371 for storing system control programs and may be used to store an interrupt program which is accessed in response to signals from the interrupt circuit 350. The call store 380 is used to store system data. Program instructions are obtained from the program store 371 and stored in the instruction stack 372 for subsequent interpretation using the instruction decoder 374. The data buffer register 382 is used as an inteface between the call store and the remainder of the circuits of the execution control, and, via conductors 381, the interrupt circuit 350. A clock circuit 376 produces a plurality of clock signals which are used in conjunction with output signals of the instruction decoder 374 to control gating within the processor. Details of such gating are generally understood and need not be described herein. An adder logic circuit 384 is provided to accomplish mathematical and logical operations. This unit communicates with general registers 386 by means of two internal buses 390 and 392. These buses are also used to communicate with the I/O control 370 via conductors 391 and 393.

Figure 4:
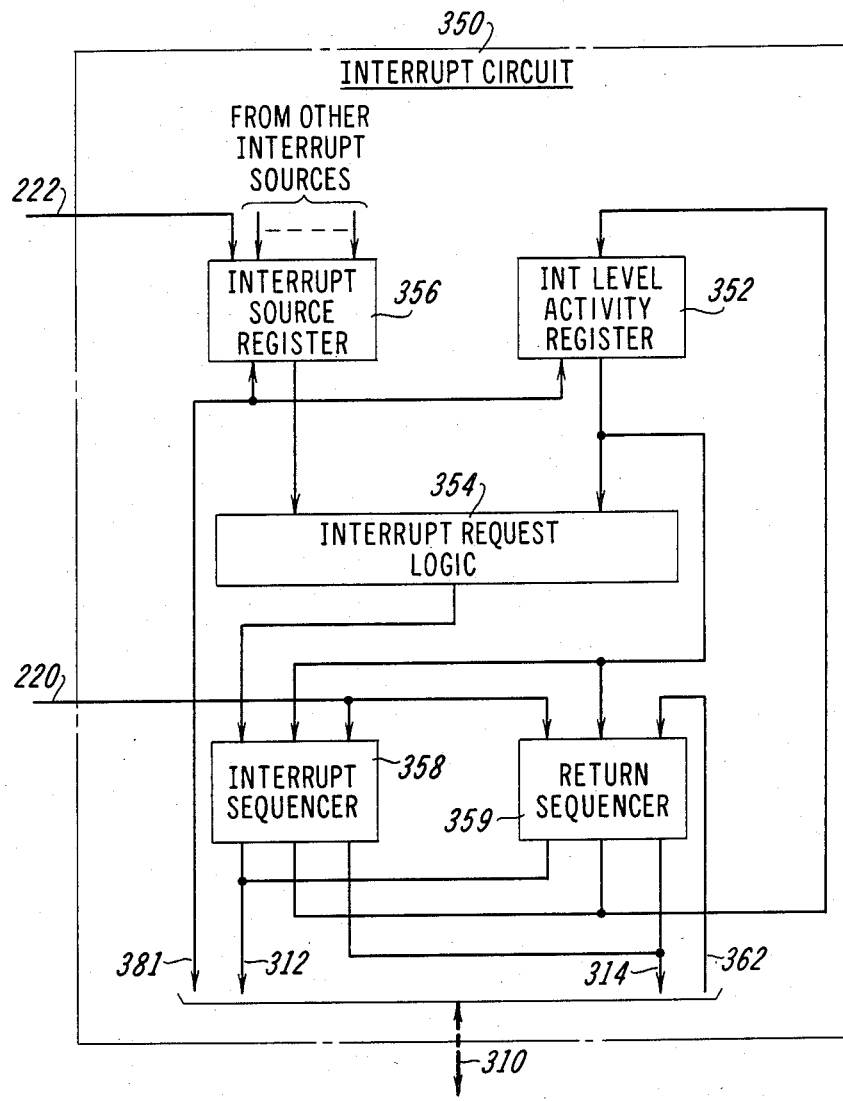
FIG. 4 is a diagram of the interrupt circuit of the processor.

FIG. 4 is a block diagram of the interrupt circuit 350 which is part of the processor 300 and is coupled to the execution control 360 by means of cable 310. The interrupt circuit may be adapted to handle a number of interrupts from a plurality of sources and for this reason, an interrupt source register 356 has been provided. Interrupts are generally assigned levels according to the source from which they originate. Generally, any interrupt will cause the execution of so-called base level system tasks to cease and cause an interrupt program to be executed. Furthermore, an interrupt of a higher level may cause an interrupt program of a lower level to be interrupted. The interrupt level activity register 352 interacting with the interrupt source register 356 through the interrupt request logic 354, is used to control interrupt activity. An interrupt signal on the conductor 222 from the adjustable incremental load simulator 200 causes a flip-flop in the interrupt source register 356 to be set and the interrupt request logic 354 will respond by activating interrupt sequencer 358. Interrupt source register 356 and interrupt level activity register 352 can be controlled from the execution control 360 via data buffer register 382 and conductors 381. These facilities can be used, for example, to read a flip-flop in the interrupt source register, by allowing the present contents of the interrupt source register to be combined with a data word from the program store and using the result to set up the interrupt source register. Upon completion of an interrupt program, the return sequencer 359 causes the execution control 360 to return to the execution of the program which was interrupted. Specific details of the interrupt circuit and its operation need not be described herein, since, they are known in the art and are described, for example, in U.S. Pat. No. 3,570,008, Downing et al., as well as in the aforementioned September, 1964, issue of *The Bell System Technical Journal.*

Figure 5:
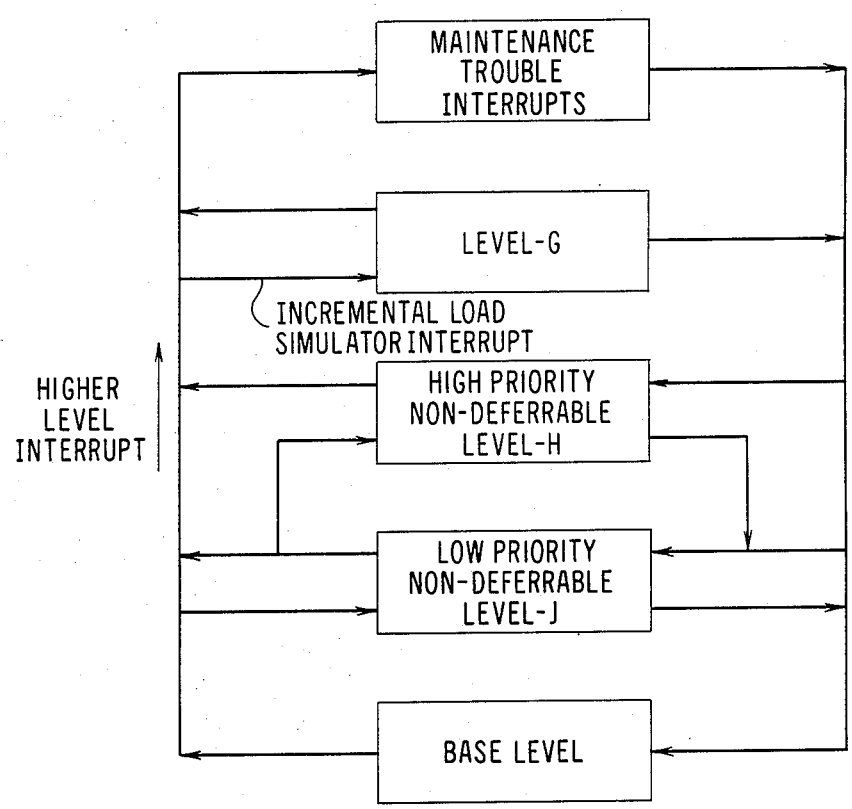
FIG. 5 is a diagram showing the relationship among the various levels of interrupts in the illustrative system.

FIG. 5 shows an exemplary interrupt hierarchy similar to what is commonly used in program controlled telephone switching systems. The figure shows the lowest level to be base level programs and the highest level to be maintenance trouble interrupts. The other work such as high priority non-deferable work and low priority non-deferable work have been assigned levels H and J, respectively. Signals from the adjustable incremental load simulator 200 have been assigned to level G in this illustrative embodiment. Thus, the adjustable incremental load simulator 200 will interrupt levels H and J and base level, but can be interrupted by trouble conditions. Accordingly, if the adjustable incremental load simulator is working with a system which starts to develop trouble, the trouble interrupt takes priority, thereby permitting normal error recovery programs to restore system service.

As mentioned earlier, the interrupt sequencer 358 is initiated in response to an interrupt signal transmitted to interrupt source register 356. Once activated, the interrupt sequencer carries out a number of functions extending over a period of several machine cycles. First, it controls the interrupt level activity register 352 by setting a flip-flop corresponding to the level of interrupt currently being served. Next, by transmitting signals via conductor 312 to the instruction decoder 374 of the execution control 360, the interrupt sequencer causes the execution control to store certain internal data of the execution control 360 in its memory. Finally, by transmitting signals over conductor 314 to the address generator 378, the interrupt sequencer causes the execution control 360 to initiate the execution of the interrupt program corresponding to the class of interrupt being served. Having completed these tasks, the interrupt sequencer becomes inactive and the interrupt program is carried out directly by the execution control 360. Upon completion of an interrupt program, a special instruction is initiated which activates the return sequencer 359 via conductor 362. This sequencer resets the appropriate flip-flop in the interrupt level activity register 352 by transmitting appropriate signals over conductors 312 and 314 to the instruction decoder 374 and address generator 378, respectively, causes the execution control to restore the contents of internal registers and to cause the interrupted program to be resumed.

As will be appreciated from the above discussion, a number of machine cycles are consumed in the initiation of an interrupt program and the restoration to the interrupted program. In one particular embodiment, an interrupt program has been constructed which consists of a number of instructions which when executed do not affect the operation of the system. The number of cycles required for execution of this program when added to the number of cycles required for the initiation of this interrupt program and the restoration to the interrupted program, have been calculated to be equal to exactly 30 machine cycles. For this reason, the incremental load simulator 200 generates interrupt signals at the rate of, at most, 1 every 30 machine cycles. It will be apparent, that when the load simulator 200 has been adjusted to 50 percent, it will generate an interrupt signal once every 60 machine cycles. Hence, the interrupt circuit 350, under those conditions, prevents the execution control 360 from executing system tasks for 30 out of every 60 cycles, or 50 percent of the time.

Figures 6, 7:
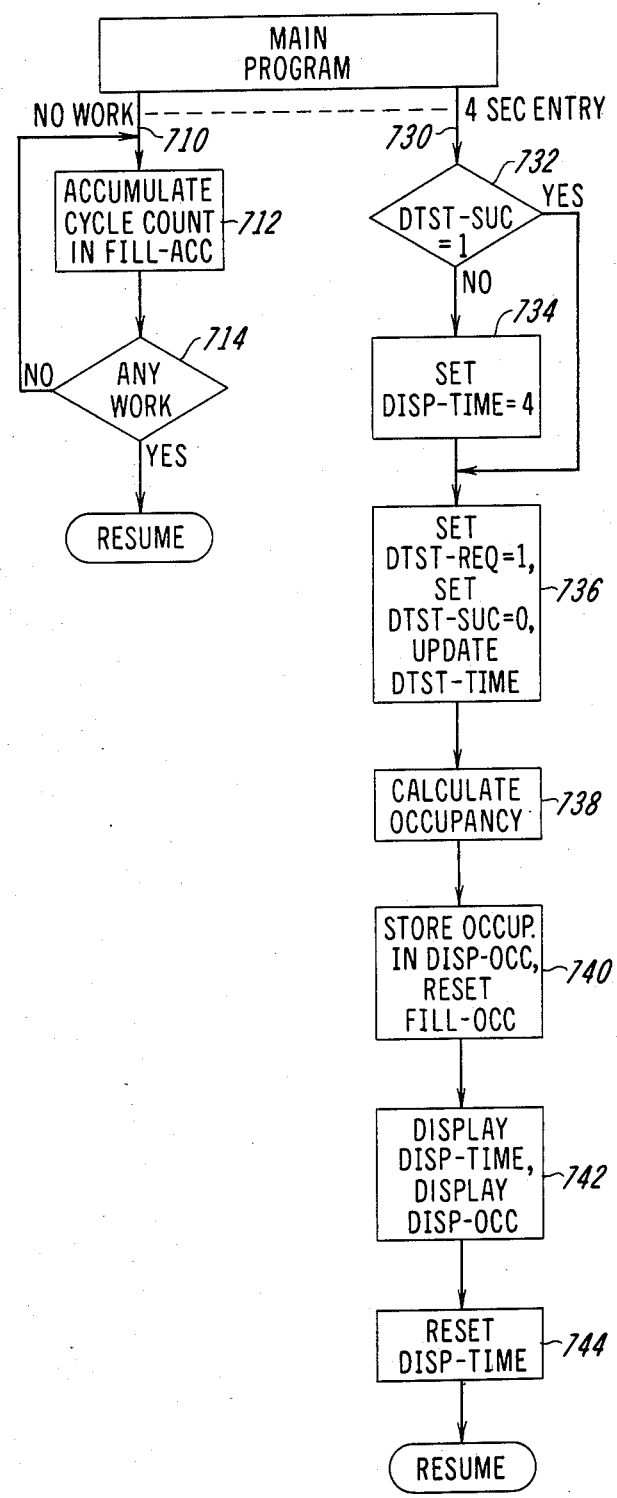
FIG. 6 shows a layout of the memory registers referred to in the description.
FIG. 7 is a flow diagram of programs for measuring available time, for setting up a test request for service, and for controlling the display of the results of performance measurements.

To determine when a system such as a program controlled telephone switching system approaches an overload condition, the system performance may be measured and indications of system performance may be displayed, for example, on the performance display 150. The measurement of available system time after all system tasks which must be performed during a specified time period have been completed, may be used to provide one indication of system performance. Another indication of system performance may be obtained by measuring the amount of time required by the system to respond to a specific demand for a system task execution. Methods for measuring system performance are well known. System performance measurement schemes for a typical telephone switching system are described with respect to FIGS. 6 through 9. As illustrated in FIG. 7, the system tasks are executed under control of a main program. The operation of such a program for a telephone switching system is well known and described, for example, in the aforementioned September, 1964, issue of *The Bell System Technical Journal*.

FIG. 7 shows that when there is no main program work, the program will enter a routine defined essentially by block 712. This represents a fill program which requires a specified number of machine cycles for execution and each time through the program a register containing the cycle count is incremented. This register may be a memory register as depicted graphically in FIG. 6, identified as FILL-ACC, referred to as the fill accumulator register. Upon completion of the program of block 712, a decision block 714 indicates that the fill program will be repeated if there is no additional work for the main program or if there is additional work, a return will be made to the main program indicated by the RESUME block in FIG. 7.

One of the functions of the main program is to perform certain specified work every 4 seconds. This is indicated on FIG. 7 by the sequence depicted subsequent to line 730 on the flow diagram. This leg of the program is used to initiate a dial-tone speed test and display system performance figures on the display 150 based on the contents of the fill accumulator register and the results of the dial-tone speed test. The dial-tone speed test is a test which may be performed in a telephone switching system to obtain a measure of the delay which a customer will encounter from the time that a telephone receiver is taken off-hook to the time that the dial-tone signal is applied to the receiver.

The dial-tone speed test is described further below with respect to FIG. 8. Referring again to FIG. 7, the first step after entry in the 4-second program is to determine whether the last dial-tone speed test was successful. An indication of the success is stored in the entry DTST-SUC which may be a memory register as depicted in FIG. 6. If the last test was not successful, it must have taken at least 4 seconds to complete and the program will arbitrarily enter the number 4 in a memory register shown in FIG. 6 identified as DISP-TIME. The contents of this register will be transmitted subsequently to the display 150. Assuming that the prior speed test was successful, the program as depicted in block 736 sets a specified memory bit identified as DTST-REQ in FIG. 6, to 1, resets the DTST-SUC entry, and enters the current time of day in a memory register identified in FIG. 6 as DTST-TIME.

Next, the program calculates the percent occupancy of the system on the basis of the contents of the memory register FILL-ACC. This calculation consists of dividing the number of cycles represented by the contents of FILL-ACC by the number of processor machine cycles in a 4-second period and subtracting that fraction from unity to give a fractional occupancy figure, which when multiplied by 100 provides a percent occupancy indication. The next step in this program sequence is to store the percentage occupancy figure in the memory register identified in FIG. 6 as DISP-OCC and resetting the FILL-ACC register.

Subsequently, in block 742 the contents of DISP-TIME and of DISP-OCC are transmitted to display 150. To accomplish this, the execution control transmits this data over conductor 391 to I/O control 370 which, in turn, transmits to the performance display 150 in a well-known manner. The last step in the program of FIG. 7 in block 744 is to reset the DISP-TIME register and return to the main program.

Figure 8:
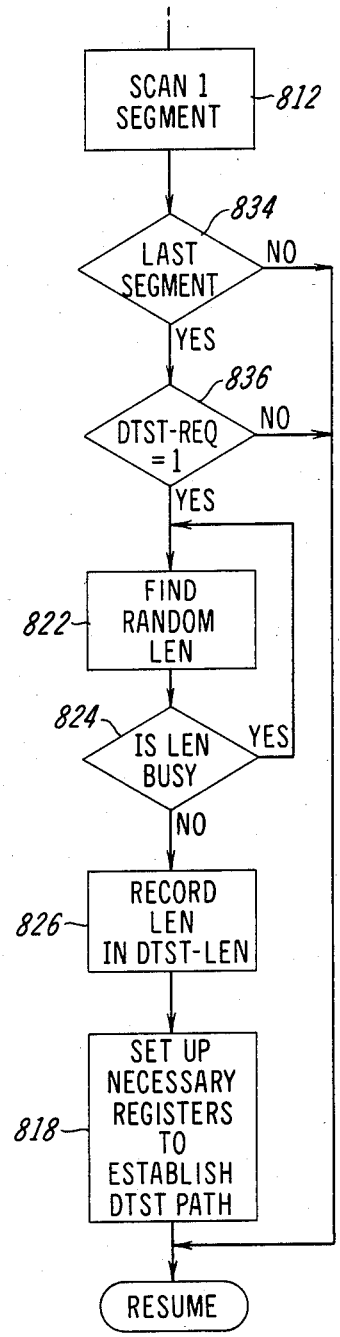
FIG. 8 is a flow diagram of a program for processing a test request for service.
Figure 9:
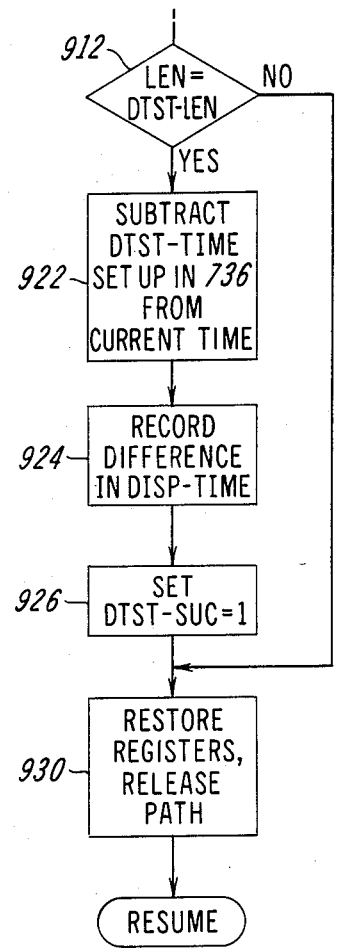
FIG. 9 is a flow diagram of a program executed following the successful completion of a test request for service.

FIG. 8 is a block diagram representation of a dial-tone speed test program. One of the functions of the main program is to periodically scan all of the subscriber lines of the system to determine their current status. This is usually done by scanning one segment of all lines, for example, 10 percent, at a time as represented by block 812. After each scan operation, a test is made as represented by box 834 to determine whether this is the last segment. If not, then the program resumes and continues scanning. If it is, the memory entry DTST-REQ, which is set every 4 seconds by the program of FIG. 7, is tested and if it is set, the program will randomly choose a line equipment number which corresponds to one of the subscriber lines connected to the system represented by block 822. A busy test is made of the chosen line represented by block 824 and if the corresponding line is busy, a new line equipment number wil be chosen. As represented by block 826, a non-busy line equipment number is recorded in the entry DTST-LEN depicted in FIG. 6. Subsequently, as represented by block 818, the normal facilities of the main program are used to generate peripheral commands for setting up a path from the randomly selected subscriber line to a dial pulse receiver which is used to provide dial tone to the subscriber. Thereafter, the program will return to the main program. It is advantageous in such a test sequence to avoid one connection namely, a connection from the subscriber line to the line side of the network, in order to avoid interference with the normal use of the subscriber line.

Peripheral commands are commonly stored in a peripheral buffer for execution by an input/output program at an appropriate time. Details of such a program are not discussed herein, since, they are well known. Upon completion of the execution of the peripheral commands, the main program causes entry to be made in the program depicted in FIG. 9. As indicated by block 912, a test is made to determine whether the line equipment number being processed is the current dial-tone speed test number as stored in memory entry DTST-LEN by the line scan program of FIG. 8. Assuming that it is the appropriate line equipment number, the program, as depicted in block 922, subtracts the time entered in the memory entry DTST-TIME by the program of block 736 of FIG. 7, from the current time of day. This, then gives an indication of elapsed time from the time that the dial-tone speed test request was made to the time that completion of the path was acknowledged. In block 914, the elapsed time is recorded in memory entry DISP-TIME. This information will be used at a subsequent time by the program of FIG. 7 to display an indication of the time. Block 926 indicates that the memory entry DTST-SUC is set to a 1 indicating successful completion of the dial-tone speed test. Thereafter, the program as depicted by block 930 will release the network path and restore memory entries used in the performance of the dial-tone speed test.

It is to be understood that the above-described arrangement is merely an illustrative application of the principles of the invention; numerous other arrangements may be devised by those skilled in the art without departing from the spirit and scope of the invention.

We claim:

1. In a digital processing, telecommunication, or telephone control system, apparatus for simulating an overload state and testing the performance of the system in the simulated overload state, comprising:

control means responsive to requests for service for executing system tasks; and manually controllable interrupt signal generating means for generating interrupt signals at a manually adjustable rate;

said control means responsive to said interrupt signals for simulating an overload state by preventing the execution of system tasks for a percentage of time directly proportional to the rate of said interrupt signals;

said control means comprising clock means and operative under program control for testing system performance by measuring the time required by said system to respond to requests for service.

2. In a digital processing, telecommunication, or telephone control system, apparatus for simulating an overload state and testing the performance of the system in the simulated overload state, comprising:

control means resonsive to requests for service for executing system tasks; and manually controllable interrupt signal generating means for generating interrupt signals at a manually adjustable rate;

said control means responsive to said interrupt signals for simulating an overload state by preventing the execution of system tasks for a percentage of time directly proportional to the rate of said interrupt signals;

said control means comprising clock means and operative under program control for testing system performance by measuring the time required by said system to respond to task execution demands.

3. A digital processing system in accordance with claim 1, further comprising display means connected to said control means for displaying time required for said system to respond to said requests for service.

4. A digital processing system in accordance with claim 3, wherein said control means is further adapted to generate said requests for service.

5. A digital processing system in accordance with claim 3, or claim 4, or claim 1, or claim 2, wherein said clock means comprises means for generating timing signals defining processor cycles and said means for generating interrupt signals is responsive to said timing signals for generating said interrupt signals.

6. A digital processing system in accordance with claim 1 or claim 2 wherein said control means is further operative under program control for measuring time available after said system tasks have been executed.

7. A digital processing system in accordance with claim 6, further comprising display means connected to said control means for displaying data indicative of available task execution time.

8. A digital processing system in accordance with claim 6, wherein said control means comprises timing means for generating timing signals defining execution control cycles and said interrupt means comprises manually settable adjustment means calibrated to indicate the percentage of available system task execution time to be devoted to responding to said interrupts, and digital circuit means connected to said adjustment means and responsive to said timing signals for generating said interrupt signals at a rate corresponding to the percentage indicated by said adjustment means.

9. A digital processing system in accordance with claim 8 wherein said adjustment means comprises first and second manually settable dials for defining a two-digit percentage number and said digital circuit means comprises multiplier means connected to said first manually settable dial and responsive to said timing signals to generate a first repetitive pulse having a pulse rate which is a fraction of the rate of said timing signals, said fraction being determined by a first number defined by the setting of said first dial, adder circuit means connected to said second manually settable dial for adding a predetermined amount to a second number defined by the setting of said second dial, selector means responsive to said first repetitive pulse to generate an output signal representative of said second number for a fraction of each predetermined time period and representative of said incremented number for the remainder of said predetermined time period, said fraction being determined by said first number, and means connected to said selector means and responsive to said timing signals to generate said interrupt signals.

10. In a digital processing, telecommunication, or telephone control system having a processor executing system tasks in response to task execution demands, a method of controllably driving said system into an overload state by depriving said system of a sufficiently large percentage of time for the execution of requested system tasks, comprising the steps of:

generating interrupt signals at a manually adjustable controllable rate;

halting the execution of said system tasks by said processor for a specified period of time in response to each of said interrupt signals, thereby preventing execution of system tasks for a percentage of time directly proportional to the rate of said interrupt signals; and testing system performance by measuring the time required to respond to requests for service.

11. The method of claim 10, wherein said step of measuring system performance comprises:

detecting the time of occurrence of a selected task execution demand;

detecting the time of response of said system to said selected task execution demand; and subtracting said time of occurrence from said time of response.

12. The method of claim 11, wherein said method further comprises the step of generating said selected task execution demand.

13. In a digital processing, telecommunication, or telephone control system executing system tasks in response to task execution demands, a method of controllably driving said system into an overload state by depriving said system of a sufficiently large percentage of time for the execution of system tasks, comprising the steps of:

generating a plurality of interrupt signals at a manually adjustable controllable rate during a specified time period;

halting the execution of said system tasks for a predetermined period of time in response to each of said interrupt signals thereby preventing execution of system tasks for a percentage of time directly proportional to the rate of said interrupt signals; and measuring time not required for system task execution and halting in response to said interrupt signals during said specified time period.

14. The method of claim 13, wherein said method further comprises the step of measuring system performance, including the steps of:

detecting the time of occurrence of a selected task execution demand;

detecting the time of response of said system to said selected task execution demand; and subtracting said time of occurrence from said time of response.

15. The method of claim 14, wherein said method further comprises the step of generating said selected task execution demand.

16. In a digital processing, telecommunication, or telephone control system executing system tasks in response to system inputs, a method of controllably driving said system into an overload state by depriving said system of a sufficiently large percentage of time for the execution of requested system tasks, comprising the steps of:

generating a plurality of interrupt signals at a manually adjustable controllable rate during a specified time period;

halting the execution of said system tasks for a predetermined period of time in response to each of said interrupt signals thereby preventing execution of system tasks for a percentage of time directly proportional to the rate of said interrupt signals;

detecting the time of occurrence of system inputs;

detecting the time of response to said system inputs;

subtracting said time of occurrence from said time of response; and controlling a display for displaying result of said subtraction.

17. The method of claim 16, wherein said system input is a request for service.

18. The method of claim 17, wherein said request for service is produced by said digital processing system.

19. The method of claim 18, wherein said controllable rate is arranged to halt the system for an adjustable percentage of total time available for system tasks.

* * * * *